United States Patent [19]

Lang et al.

[11] 4,363,264

[45] Dec. 14, 1982

[54] COUNTER CURRENT DIFFUSION EXTRACTOR

[75] Inventors: Timothy R. Lang, Pymble; Donald J. Casimir, Killara, both of Australia

[73] Assignees: Howden Equipment Services Pty. Ltd., Sydney; Commonwealth Scientific and Industrial Research Organisation, Campbell, both of Australia

[21] Appl. No.: 192,130

[22] Filed: Sep. 29, 1980

[30] Foreign Application Priority Data

Feb. 15, 1980 [AU] Australia .............................. PE2383
Jul. 7, 1980 [AU] Australia .............................. PE4410

[51] Int. Cl.³ .............................................. A23N 1/00
[52] U.S. Cl. ....................................... 99/510; 99/513; 100/72; 100/117; 100/145; 366/87; 366/137
[58] Field of Search ................. 99/513, 510, 509, 495, 99/348; 100/117, 73, 72, 145, 147–150; 366/81, 87, 90, 99, 100, 136, 137, 192, 196, 319, 324; 425/207, 208; 210/173, 174; 241/260.1

[56] References Cited

U.S. PATENT DOCUMENTS

| | | | |
|---|---|---|---|
| 1,211,398 | 1/1917 | Burgard | 366/319 |
| 2,355,091 | 8/1944 | McDonald | 100/73 |
| 2,793,582 | 5/1957 | Rothe et al. | 99/495 |
| 3,083,634 | 4/1963 | Rietz | 100/72 |
| 3,749,374 | 7/1973 | Buchheit | 366/100 |
| 4,223,996 | 9/1980 | Mathis et al. | 366/319 |

FOREIGN PATENT DOCUMENTS 1084828  9/1967  United Kingdom .

Primary Examiner—Philip R. Coe
Assistant Examiner—Timothy F. Simone
Attorney, Agent, or Firm—Millen & White

[57] ABSTRACT

A counter current extractor in which material to be extracted is caused to move in counter current with an extracting liquid by a screw conveyor characterized in that the direction of rotation of the screw conveyor is intermittently reversed. A process for extracting soluble and dispersible materials using such a counter current extractor is also disclosed.

8 Claims, 8 Drawing Figures

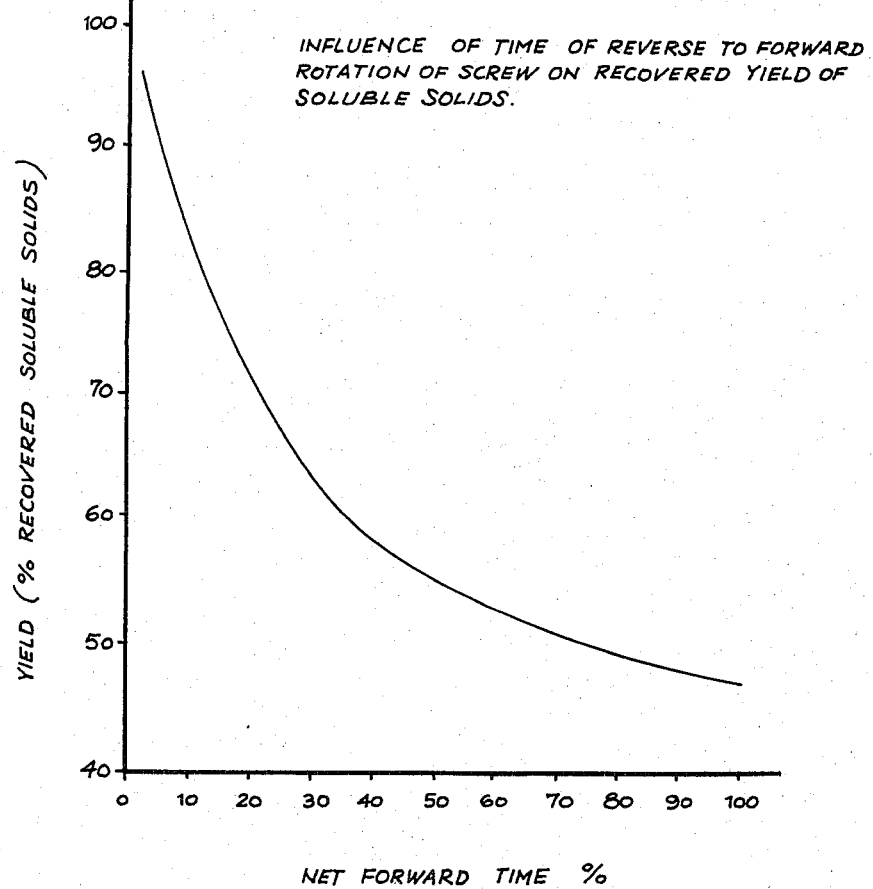

COUNTER CURRENT DIFFUSION EXTRACTOR

BACKGROUND OF THE INVENTION

The present invention relates to in an improved counter current extractor incorporating a screw conveyor, and to an improved process for the counter current, extraction of soluble or dispersable materials from a substrate using such an extractor.

Counter current extractors are well known in the food processing industry for the continuous extraction of liquids, solubles, and fine particlulate matter from associated solids. Such diffusers generally comprise a pair of parallel counter-rotating screw conveyors mounted within an inclined or vertical elongate housing, which takes the form of a trough or totally encased tube. Material to be processed, such as chopped sugar beet, is fed into the lower end of the housing and carried upwards by screw rotation while an extracting liquid (usually water) is fed into the top of the housing and flows downwards under gravity. Single screw counter current extractors are also known, but are recognized as being relatively inefficient because the solid matter tends to build up on one side of the housing, while the liquor tends to flow relatively unimpeded down the other side. A similar problem may be experienced with double screws, but to a lesser extent, because the counter rotation encourages more even distribution of solids over the width of the screws.

Single screw conveyors offer the important advantages of simplicity and cheapness as compared with twin screw counter current extractors, and attempts have been made to improve the efficiency of such single screw extractors.

SUMMARY OF THE INVENTION

The present inventors have surprisingly found that the efficency of operation of counter current extractors can be substantially improved by the relatively simple expedient of intermittently reversing the direction of rotation of the screw conveyor. The reversal of the direction of rotation of the screw conveyor causes the relatively compacted mass of matter being extracted to be opened up allowing the extracting liquid to penetrate the mass. The extracting liquid is then expressed from the mass, when the screw conveyor resumes its original direction of rotation, and carries with it dissolved and dispersed extractable matter.

The present invention involves a counter current extractor comprising an elongate housing in the form of a trough or tube, and having an inlet at or adjacent one end and an outlet at or adjacent the other end, a screw conveyor disposed within the housing and rotatable about its longitudinal axis to move material introduced into the housing from the said one end to the said other end, means for introducing an extracting liquid into the said other end of the housing and to cause it to flow along the housing to the said one end, and drive means to cause the screw conveyor to rotate, characterised in that the drive means is such that the direction of rotation of the screw conveyor is intermittently reversed.

In a further aspect the present invention comprise a improvement in a process of extracting soluble or dispersable materials from a substrate in a counter current extractor comprising reversing the direction of rotation of a screw conveyor in the extractor intermittently.

While the present invention is hereinafter described with reference to counter current extractors using a single screw conveyor, it is to be appreciated that the present invention can be used with counter current extractors having a plurality of screw conveyors. Moreover further discussion will be limited to the use of screw diffusers for the extraction of components from vegetable matter and the like, whereas in practice diffusers can be used for what may be described as the reverse of extraction, i.e. for impregnating solid matter with a liquor, and such an application is also considered to fall within the scope of this invention.

In a particularly preferred embodiment of the present invention the side of the flight of the screw conveyor which is not active in moving said material towards the said other end of the housing is provided with a plurality of substantially radially disposed ribs in spaced apart locations along the length of the screw conveyor. These ribs serve to engage the substantially compacted mass of solid substrate material in the extractor and to assist in breaking it up to allow free percolation of the extraction liquid into the mass of solid material. If desired, such ribs may also be provided on the surface of the flight which acts to move the solid material from the one end to the other end of the housing.

It is preferred that strainer means be provided to filter the extracted liquid prior to its removal from the one end of the housing. The strainer means preferably comprises a plate extending transversely across the housing at or adjacent the one end thereof and through which projects a driving shaft for the screw conveyor. The plate is provided with at least one aperture through which extracting liquid may pass and a filter disc being provided in close juxtaposition with the plate on the side thereof distal for the other end of the housing and arranged to rotation with the driving shaft of the screw conveyor past the said aperature or apertures in the plate and hence be self cleaning.

Means are preferably provided for recycling extracting liquid from the one end of the housing, heat it to some desired temperature, and return it to the housing at a point between the one end and the other end of the housing. A suitable proportion of the extracting liquid discharged from the lower end of the housing is desirably diverted through an independent heat exchanger where it is heated and recirculated to the housing at some point above the said one end. As the objective is to achieve rapid heating of material at an early stage of processing, the heated, recirculated liquor should be introduced into the lower half of the housing, preferably at a point from about 1/20 to about ¼ the length of the housing from the said one end.

In a further refinement, the extractor is also provided with means for ensuring a predetermined extracting liquid level in the lower regions of the housing, since it has been found that solids/liquid contact is enhanced if the extracting liquid is allowed to accumulate to a controlled extent in the vicinity of the solids charging point. Suitable control means would, for example, sense the liquor level and compensate for changes by automatic adjustment of outflow and/or inflow rates of the extracting liquid.

The housing of the extractor is preferably provided with a jacket through which a fluid may be passed. In this way the temperature of the housing and to some degree the temperature of the contents thereof may be controlled.

The drive means for the extractor may comprise any suitable reversible drive. It is preferred that the drive means comprises an electric motor or a hydraulic motor which is reversible. In an alternative embodiment a reversing gearbox may be interposed between the motor and the screw conveyor.

In the same way as with diffusers which are run with a continuous forward screw motion, the performance of diffusers operated in accordance with the principles outlines above will be influenced by many factors, such as the nature of the charge, the temperature of the charge, liquor flow rate, screw inclination, screw rotation rate and screw helix angle, and individual operators will vary these to meet their particular requirements. Nevertheless, a further feature of this invention is the recognition, that for maximum efficiency, an optimum relationship exists between the time the screw(s) is operated forwardly and the time it is operated in reverse. Broadly stated, this is that, preferably the net forward time of operation of the screw should not exceed about 75%, more preferably it should not exceed about 50%, and most preferably it should not exceed about 25%.

In this specification net forward time is defined as:

$$\frac{TF - TR}{TF + TR} \times 100$$

where
TF = total time of operating the screw with a forward motion
TR = total time of operating the screw with a reverse motion.

The yield of recovered soluble solids will be found to increase as the net forward time decreases, but clearly there will be an accompaying decrease in flow rate which will need to be taken into consideration when determining optimum economic operating conditions.

The extracting liquid will frequently be water however other liquids including organic liquids or aqueous or organic solutions could be used. The process may be used for the extraction of soluble or dispersable material from fruit or vegetable matter such as sugar beet, sweet sorgum, grapes, grape marc, tea, citrus fruit, citrus peel, apples, pears and from animal matter such as fish heads and offal. Residue materials such as apple peels and cores, citrus peel and grape marc may also be exhaustively extracted to recover valuable soluble components which are normally discarded with these residues. Soluble sugars recovered from apple or pear peels and cores could be used in the preparation of canning syrups or fermented to alcohol. Other residues contain materials such as flavoring colours or specific useful materials such as pectins which may be recovered. For satisfactory extraction it is preferred that the materials are in a particulate form, the shape of the particles being such that the diffusion path for the migration of the soluble material out of the particles is short in at least one direction.

BRIEF DESCRIPTION OF THE DRAWINGS

Hereinafter given by way of example only is a preferred embodiment of the invention described with reference to the accompanying drawings in which:

FIG. 8 is a graph showing the influence of time of reverse to forward rotation of the screw conveyor on recovered yield of soluble solids using a counter current extractor according to this invention.

DETAILED DISCUSSION OF THE INVENTION

Figure 1:
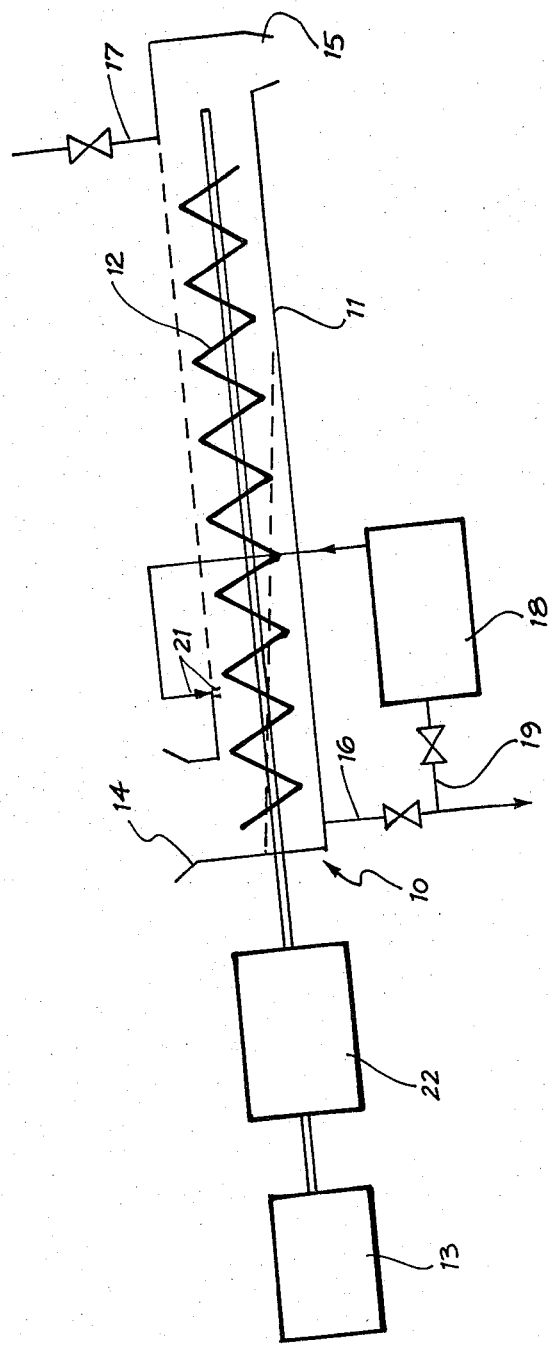
FIG. 1 is a schematic diagram of a counter current extractor according to the present invention.

As seen in FIG. 1 the counter current extractor 10 comprises an elongate trough shaped housing 11 in which is disposed a screw conveyor 12 which is arranged to be rotated about its longitudinal axis by drive means 13. The housing 11 is provided with an inlet hopper 14 for the introduction of material to be extracted. The hopper 14 is disposed above the lower end of the screw which is inclined slightly upwardly towards an outlet spout 15 for the solid material which has been treated. A discharge line 16 is provided for the discharge of the extracting liquid which is charged into the housing 11 through charging line 17. A heat exchanger 18 is provided on a bypass line 19 to heat discharged liquid and to return it through nozzle 21 to the lower end of the housing 11 to heat the material being treated.

A reversing means 22 is provided between the drive means 13 and the screw conveyor 12 to intermittently reverse the direction of rotation of the screw conveyor 12.

Figure 2:
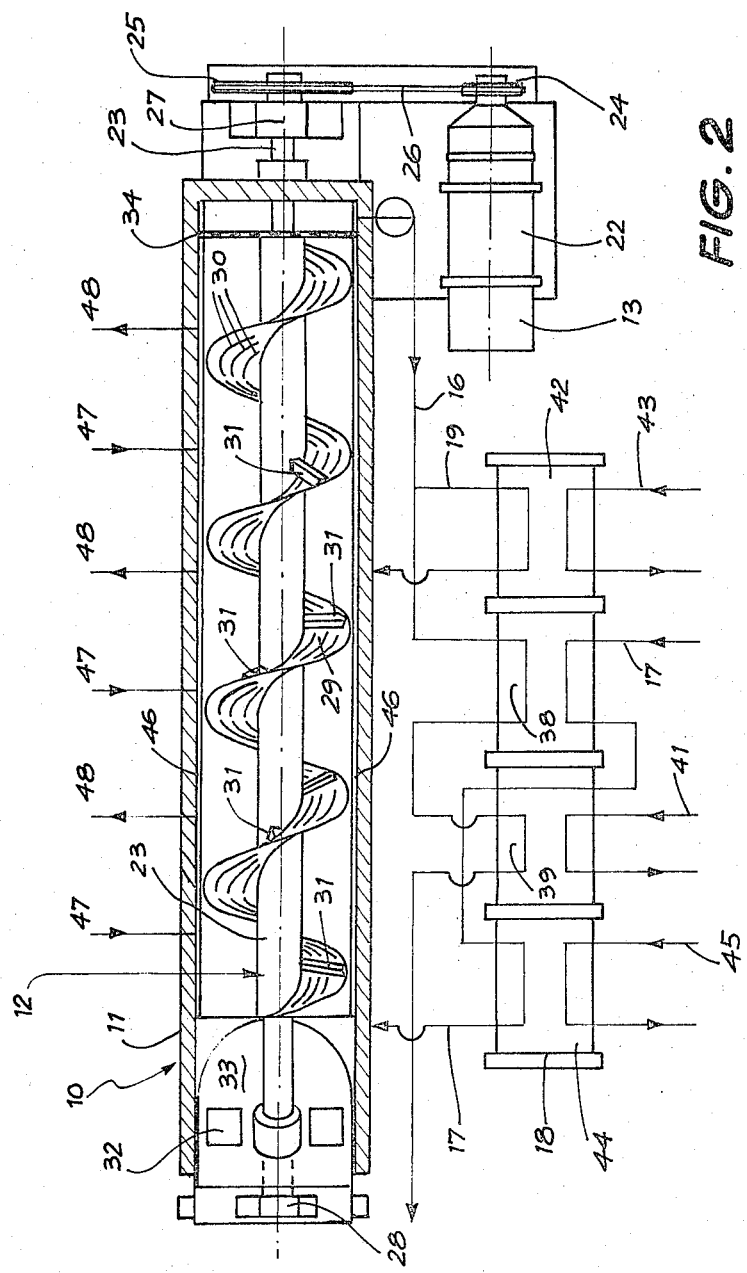
FIG. 2 is a semi schematic plan view of a counter current extractor according to this invention.
Figure 3:
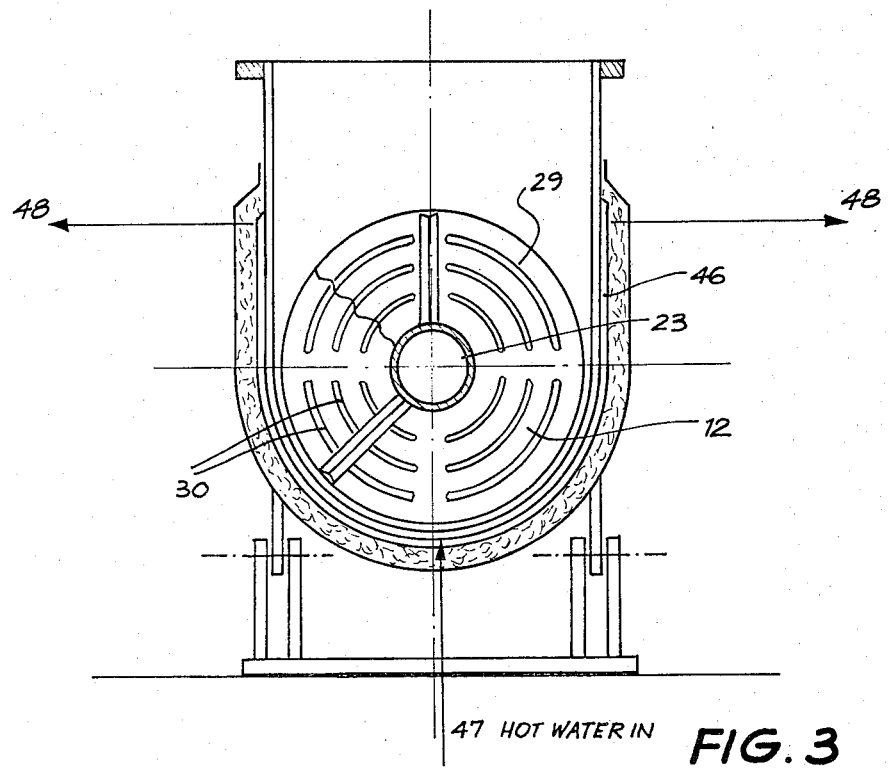
FIG. 3 is a cross sectional view of the housing and screw conveyor of the extractor of FIG. 2 looking towards the discharge end thereof.
Figure 4:
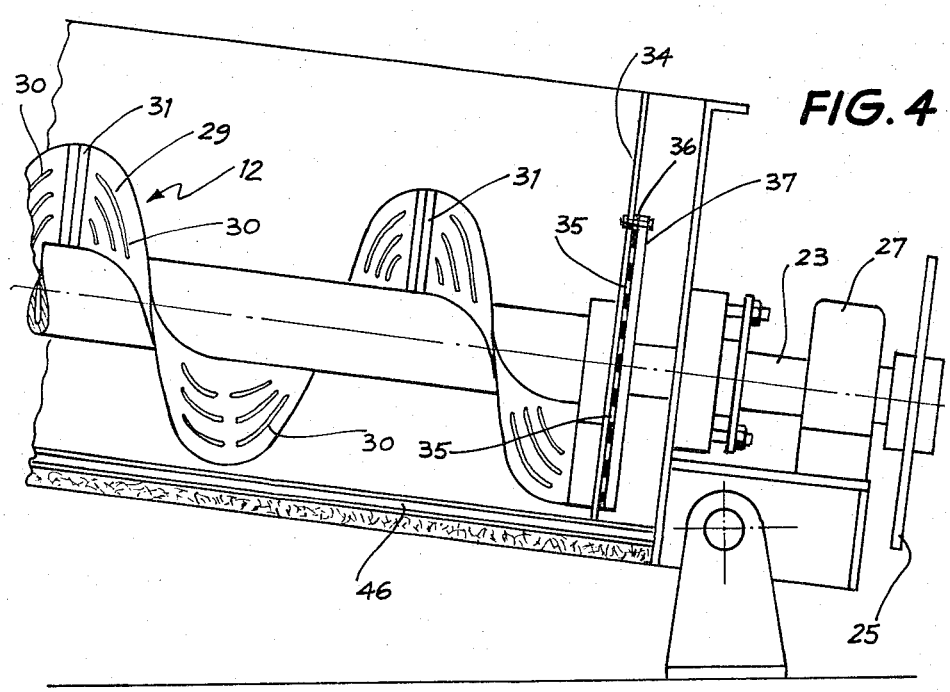
FIG. 4 is a longitudinal sectional view of the lower end of the housing and screw extractor of FIG. 2.

FIGS. 2, 3 and 4 show a counter current extractor which is similar to the extractor of FIG. 1 and the same numerals are used to identify similar parts.

The extractor 10 comprises a trough like housing 11 in which is disposed a screw conveyor 12 adapted to be rotatable about its longitudinal axis in the housing 11. A motor 13 is adapted to drive the screw conveyor 12 and includes reversing means 22 to intermittently reverse the direction of rotation of the screw. The motor 13 is operatively connected to the spindle 23 of the screw conveyor 12 through a pair of aligned claim wheels 24 and 25 and claim 26, the size ratio of claim wheels 24 and 25 being so selected that the spindle 23, and the screw conveyor 12, is rotated at about 1 R.P.M. when the motor 13 is running at a suitable operating speed. The spindle 23 is supported in bearings 27 and 28 mounted at either end of the housing 11.

The screw conveyor 12 includes a helical flight 29 disposed about the spindle 23. The flight 29 is provided with circumferential directed slits 30 and a plurality of radially extending ribs 31 disposed on the side of the flight 29 which is not active in moving material to be extracted from the inlet to the outlet end of the housing 11. Material to be extracted is changed into the housing 11 through its open top at its lower end and is discharged through discharge apertures 32 in the end plate 33 of the housing 11.

At the lower end of the housing 11 is a strainer to strain the extracted liquid prior to its discharge from the housing 11. The strainer comprises an end plate 34 which is provided with apertures 35. A screw 36 and backing plate 37 are provided behind the end plate 34 and are connected to the spindle 23 and adapted to rotate therewith. The strained extracted liquid is discharged through discharge line 16 to a heat exchanger 18 where it initially passes through exchanger plate 38 where it flows in counter current with feed water in line 17 and then through exchanger plate 39 where it flows in counter current with cooling water in line 41. The now cooled product is then discharged from the extractor through line 16. Some of the extracted juice in line 16 is diverted into line 19, passed through exchanger plate 42, where it is heated by passing in counter current with hot water in line 43, and is discharged back into the housing 11 to heat freshly introduced material which is to be extracted. The line 19 with the heated recycled liquid is discharged into the housing 11 between one tenth and one quarter of the way along the housing 11.

The feed water line 17 after passing through exchanger plate 38 passes into exchanger plate 44 where it flows in counter current with hot water in line 45. The line 17 discharges into the housing 11 at its upper end.

The housing 11 is provided with an insulated hot water jacket 46. Hot water passes into the jacket through lines 47 and out through lines 48.

In use, material to be extracted is introduced into the lower end of the housing 11 and the screw conveyor 12 is rotated to commence the movement of the material along the housing 11. Heated feed water is fed into the housing 11 through line 17 and this feed water, together with free run juice from the material, and extracted substances and particulate matter passes through the filter and is recycled through exchanger plate 42 back into the housing 11 through line 19.

As the material to be extracted progresses along the housing 11 it is compressed by the flight 29 forming a compacted mass of partly extracted material. When the direction of rotation of the screw conveyor 12 is reversed the ribs 31 bite into the compacted mass causing it to open up and admit fresh feed water. Upon the conveyor 12 reverting to its original direction of rotation the material being extracted is recompressed and the feed water, together with further extracted matter is expressed. This opening up of compacted mass of material being extracted contributes significantly to the performance of the extractor and results in improved yields of extracted matter.

Figure 5:
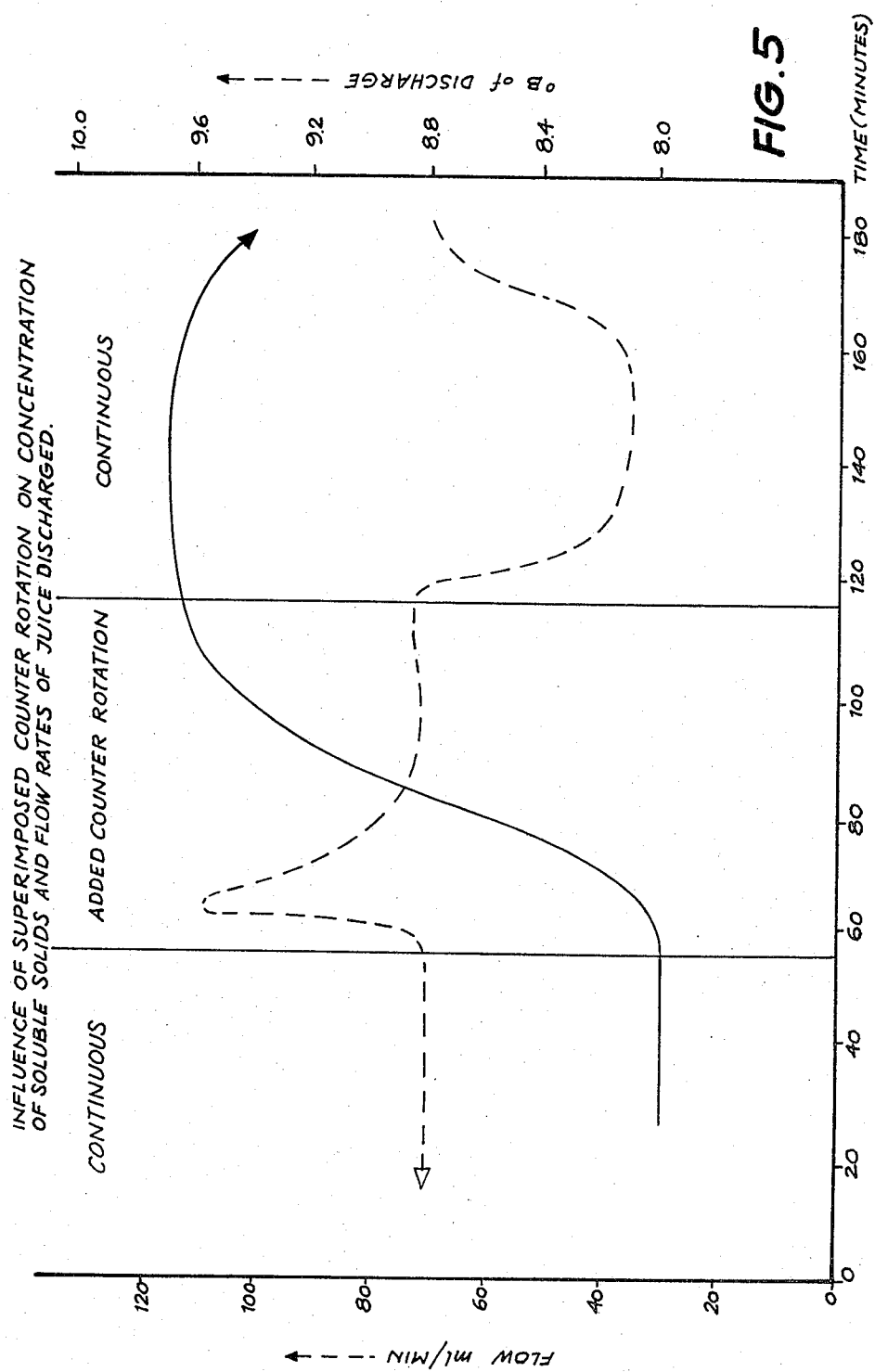
FIG. 5 is a graph showing the effect of intermittently reversing the direction of rotation of the screw conveyor of a counter current extractor according to this invention.

The results obtained and graphed in FIG. 5 were obtained using a single screw diffuser (length 2 m, diameter 20 cm, helix angle 15°, inclination 3.5° ). Initially, charged with sliced apple, the screw was driven continually forward at a speed of 1 rpm; when a state of equilibrium had been reached (determined by analysis of discharge liquor) the screw was run for a period during which forward drive was halted every 15 seconds and the screw reversed through a 1/20 revolution. Finally, the screw was run again in continuous forward mode. It will be seen from FIG. 5 that immediately upon taking up the reversing action there was an increase in liquor discharge rate, indicating an opening up of the apple mass giving drainage of liquid from the mass in the upper part of the screw. Upon return to continuous uniform rotation, liquor outflow ceased for a period as the extraction water did not flow freely through the apple mass but was held up in the tissue. The significant increase in sugar concentration (°Brix) of the discharge liquor during the counter rotation period will also be noted.

Figure 6:
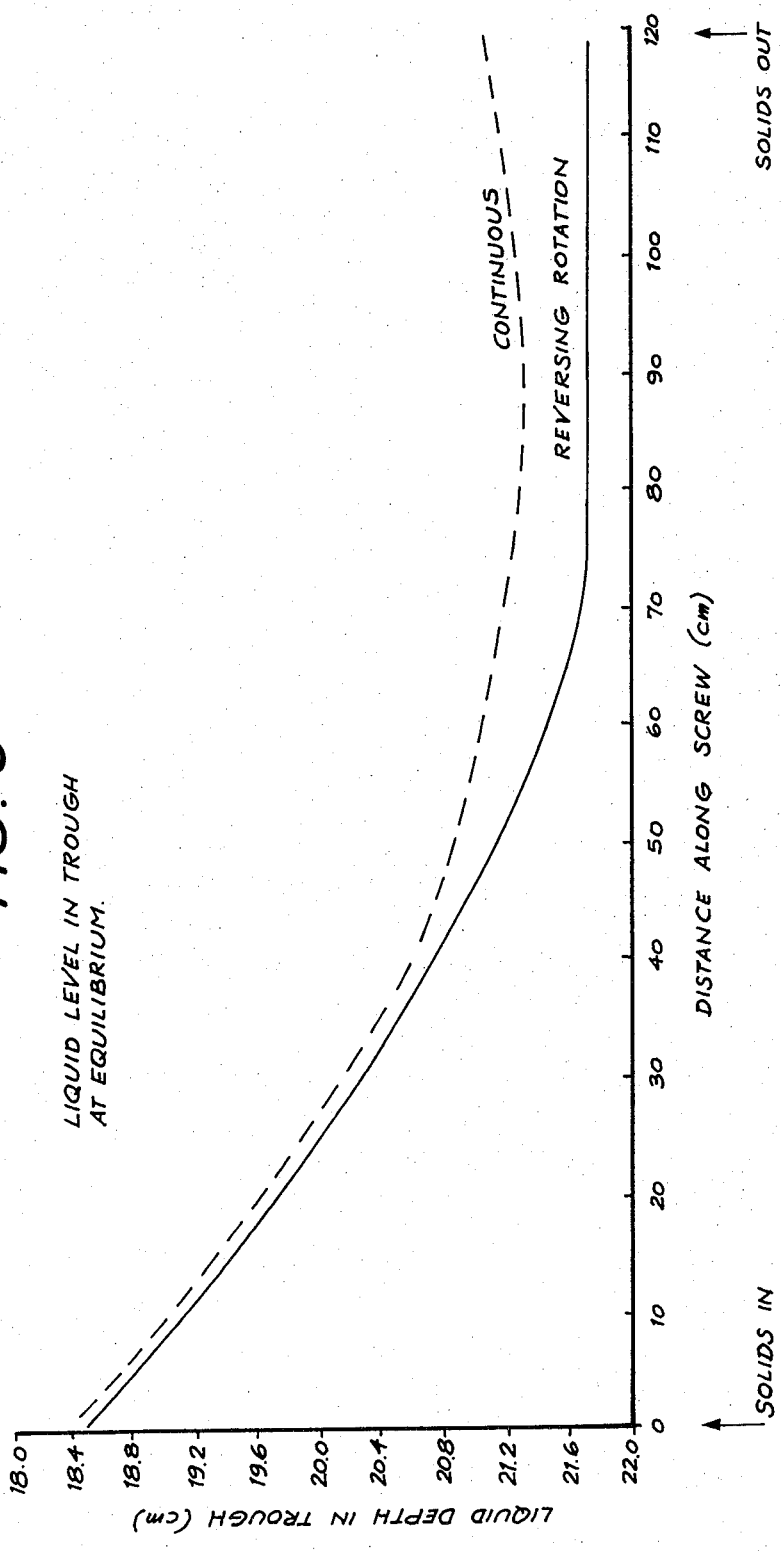
FIG. 6 is a graph comparing the liquid levels in the housing of a counter current extractor when rotated continuously in one direction and when intermittently reversed.
Figure 7:
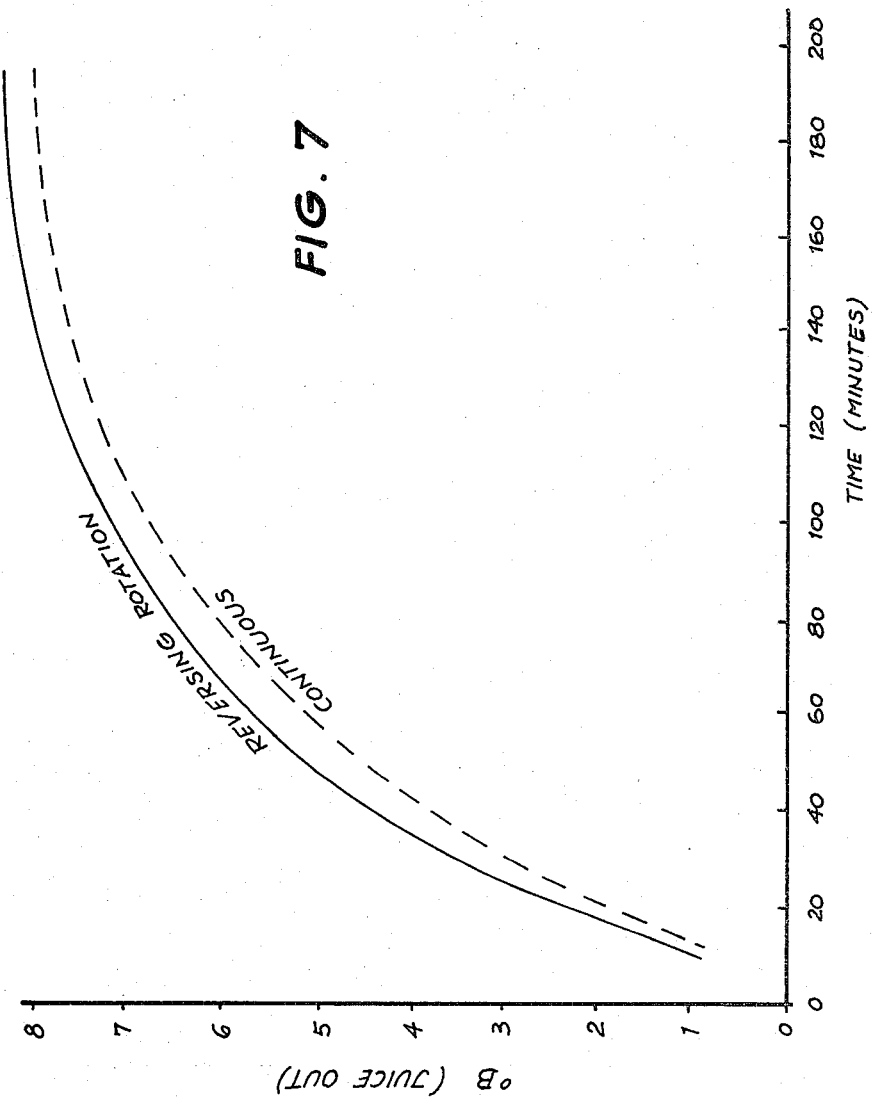
FIG. 7 is a graph showing the improved contacting efficiency of a counter current extractor according to this invention.

The data presented in FIGS. 6-8 was obtained using similar equipment, but instead the motion of the screw was controlled automatically so that the periods of counter-rotating operation consisted of sequences of 100 seconds of forward drive, alternating with 70 seconds of reverse drive. Sliced apples were fed into the extractor in lots of 352 g every 5 minutes, and water (65° C.) was fed at the rate of 77.3 g/minute to the upper end of the screw. Mass flow readings and concentrations of liquor and solids discharge were determined at intervals.

Runs were undertaken with a continuous forward screw motion and with a superimposed reversing rotation. At the completion of each run, when the system was in equilibrium, the free liquid hold-up and the solids hold-up in the screw were determined. Superimposition of the reversing motion increased the yield of soluble solids recovered, as well as increasing the concentration at which they were recovered.

FIG. 6 is illustrative of the easier flow path for liquor through the apple mass with the reversing motion applied.

The solids/liquid contacting efficiency was also found to be improved as the concentrations of soluble solids extracted, measured in °Brix, were higher when the screw had the reversing motion applied (FIG. 7).

The effect on soluble solids yield of varying the forward/reverse ratio of the screw motion was investigated feeding Shiraz grapes, and the results are shown in FIG. 8.

Hereinafter given by way of further exemplification are examples of the process according to this invention.

EXAMPLE I

Grapes of the Gordo variety which are notoriously difficult to press because of their slippery nature were taken from the end of a winery drainer and fed at a rate of 600 Kg/hr through the extractor fitted with a 4.5 m screw having a diameter of 0.5 m.

Yield data from the extractor and a conventional winery screw press are set out in the following Table.

| Component | Winery Screw Press | | Counter Current Extractor | |
|---|---|---|---|---|
| | Feed | Solids Discharge | Feed | Solids Discharge |
| Total solids % | 28.56 | 40.05 | 29.94 | 29.04 |
| Water % | 71.44 | 59.95 | 70.06 | 70.96 |
| Soluble solids % | 15.20 | 13.90 | 18.60 | 10.70 |
| Insoluble solids % | 13.36 | 26.15 | 11.34 | 18.34 |
| Soluble/insol. solids ratio | 1.14 | 0.53 | 1.64 | 0.58 |
| % Recovery Soluble from solids drained grapes | | 53.5 | | 64.6 |

In another trial 4250 Kg of Shiraz grapes were extracted and the recovery of soluble solids was 82%. The mass balance data are listed in the following table.

| Component | Feed | Solids Discharge | Juice |
|---|---|---|---|
| Soluble solids % | 25.9 | 14.2 | 20.0 |
| Amount Kg Totol sol. | 4250 | 1290 | 4,500 |

| Component | Feed | Solids Discharge | Juice |
|---|---|---|---|
| solids Kg | 1100 | 183 | 900 |

EXAMPLE II

The traditional process for the preparation of lime juice in the West Indies takes about 30 days. However using the counter current extraction process to extract the sliced fruit the time for the production of lime juice can be reduced to 1½ hours.

In one case the yield of lime juice was equal to the weight of the limes fed. This "juice" made an excellent lime juice drink when diluted with 4 volumes of water and an appropriate amount of sugar added for flavour balance.

EXAMPLE III

Using a similar procedure to limes, 100 kg of lemons produced a "juice" which when made up to 400 kg by the addition of water and 32 kg of sugar produced an excellent lemon drink.

It will be recognised by persons skilled in the art that numerous variations and modifications may be made to the invention as described above without departing from the spirit or scope of the invention as broadly described.

We claim:

1. A counter current extractor comprising: an elongate housing in the form of a trough or tube and having an inlet at or adjacent one end and an outlet at or adjacent the other end, the longitudinal axis of the housing being inclined upwardly from the one end to the other end, a screw conveyor having at least one substantially helical flight disposed within the housing and rotatable about its longitudinal axis for moving material to be extracted, which has been introduced into the housing through the inlet, from the said one end to the said other end of the housing, means for introducing an extracting liquid into the said other end of the housing in a manner such that introduced fluid will flow down the housing to the one end thereof and in counter current with the material being extracted, drive means for causing the screw conveyor to rotate and for causing the direction of rotation of the screw conveyor to be intermittently reversed while providing a net forward motion of material to be extracted from the one end to the other end, and means being provided for withdrawing extracting liquid from the housing at a point at or adjacent the one end thereof, for heating the withdrawn liquid, and for returning the heated liquid into the housing such that the returned heated liquid will contact the material being extracted.

2. A counter current extractor as in claim 1 in which the side of the flight of the screw conveyor which is not active in moving said material towards the said other end of the housing is provided with a plurality of substantially radially disposed ribs in spaced apart locations along the length of the screw conveyor.

3. A counter current extractor as in claim 1 or claim 2 in which strainer means are provided for straining the extracted liquid prior to its removal from the one end of the housing.

4. A counter current extractor as in claim 3, wherein means are provided for ensuring a predetermined extracting liquid level at the one end of the housing when the extractor is operating.

5. A counter current extractor as in claim 3 in which the strainer means comprises apertured closure means extending across the housing at or adjacent the one end thereof and through which a driving shaft for the screw conveyor projects, a straining member being provided in close juxtaposition with the aperture or apertures in the closure means on the side thereof distal to the said other end of the housing and arranged for continuously rotating past the aperture or apertures such that the straining member is self cleaning.

6. A counter current extractor as in claim 5, wherein means are provided for ensuring a predetermined extracting liquid level at the one end of the housing when the extractor is operating.

7. A counter current extractor as in claim 1 wherein said means for recycling the liquid is arranged such that the recycled liquid is returned to the housing at a point from one twentieth to one quarter of the way along the housing from its one end.

8. A counter current extractor as in claim 1, 2 or 7 wherein means are provided for ensuring a predetermined extracting liquid level at the one end of the housing when the extractor is operating.

* * * * *